Feb. 23, 1926.          1,573,935
C. R. HADLEY
TRAY BINDER
Filed August 25, 1924

Inventor:
Charles R. Hadley, deceased,
By–Frank D. Barnhill & Pacific
Southwest Trust and Savings Bank,
Executors.

By Lyon & Lyon
Attorneys

Patented Feb. 23, 1926.

1,573,935

UNITED STATES PATENT OFFICE.

CHARLES R. HADLEY, DECEASED, LATE OF LOS ANGELES, CALIFORNIA; BY FRANK D. BARNHILL AND PACIFIC SOUTHWEST TRUST & SAVINGS BANK, EXECUTORS, OF LOS ANGELES, CALIFORNIA, ASSIGNORS TO CHARLES R. HADLEY COMPANY, A CORPORATION.

TRAY BINDER.

Application filed August 25, 1924. Serial No. 734,129.

*To all whom it may concern:*

Be it known that CHARLES R. HADLEY, deceased, formerly residing in the city of Los Angeles, county of Los Angeles, and State of California, has invented a new and useful Tray Binder, of which the following is a specification.

This invention relates to loose leaf binders of the so termed "tray" type, and an object of the invention is to provide for securely holding the loose leaves against displacement while at the same time facilitating reference to the leaves.

This invention is an improvement on the disclosure of the copending application for patent of Charles R. Hadley, filed August 29, 1923, Serial Number 659,905.

Objects of this invention distinguishing from the foregoing mentioned disclosure are to improve the means for holding the end members in different positions; to improve the means for forcing the end members toward one another to hold the loose leaves in closed position; and to pivot the guide rods and releasably secure said rods in different positions of adjustment so as to facilitate offsetting of the leaves and "stuffing".

In the above mentioned former disclosure the screw is connected with the clamping members by a rigid connection, thus permitting of binding of the sliding block upon the rods along which the blocks slide. In the present instance there is provided a loose connection between the feed nuts and the sliding blocks so that such binding cannot possibly occur.

The accompanying drawings illustrate the invention:

Figure 4:
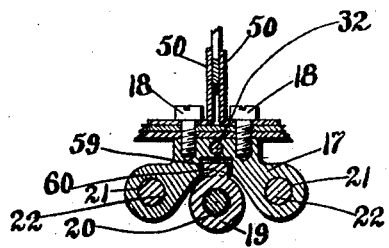
Fig. 4 is a sectional elevation on the line indicated by 4—4, Fig. 3.

There is provided a flat support 11 having cross members 12 at its outer ends. The members 12 are preferably provided with cushioning feet 13 of rubber or other suitable non-metallic substance, said feet being secured by suitable means as, for example, screws 14, to the lower edges of the member 12. The upper face of the support 11 is grooved, as indicated at 15, the grooves running transversely of the support. The face 11 may be formed of corduroy, or other suitable material, and is adapted to engage the lower edges of the loose leaves a placed in the binder. Such material, in this instance extends over the side edges of the support as seen in Fig. 4.

The loose leaves a are placed between clamping members 16 which are adjustably mounted on the support. The adjustable mounting, in this instance, is as follows: Each of the clamping members 16 has a block 17 secured to it by suitable means, as screws 18. The blocks 17 project through a slot 58 extending longitudinally at the median line of the support. The central portion of each block 17 is provided with a central recess 59 loosely engaged by a lug 60 projecting from a nut 19, the threaded orifice of which is indicated at 20. The blocks 17 are provided on opposite sides of the orifices 20 with holes 21 which slidably fit rods 22 extending in parallelism lengthwise of the support 11 below the level of the slot 58. The rods 22 are secured at their opposite ends by screws 23 to the members 12. Only the screws 23 at one end of the support can be seen in the drawings because of the nature of the views, but both ends are alike.

Figure 1:
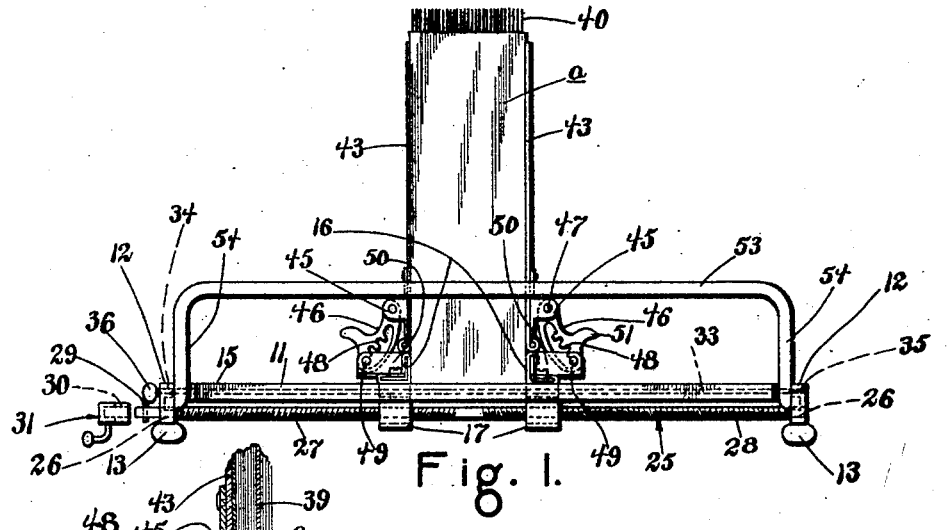
Figure 1 is a side elevation of a tray binder constructed in accordance with the provisions of this invention. The parts are shown as they appear when the binder is closed.

Means are provided for holding the blocks 17 at different positions along the rods, said means operating to force one of the clamping members 16 toward the other to clamp the loose leaves therebetween. The means at present provided furthermore operate to simultaneously move the clamping members toward and from each other, and these means are constructed as follows:

Engaging the threaded orifices 20 of the blocks 17 is a screw 25 rotatably mounted at its opposite ends in bearings 26 in the cross members 12. The screw 25 is provided at one end with a threaded portion 27 and at its opposite end with a threaded portion 28. One of the threaded portions has left-hand threads and the other right-hand threads so that, when the screw is turned in one direction it will cause the clamping members to approach one another and when turned in the opposite direction will cause the clamping members to travel away from one another. One end of the screw 25 is provided with a transversely extending pin 29 adapted to be engaged by notches 30 of a detachable crank 31, shown in Fig. 1.

The blocks 17 are provided centrally above the recesses 59 with holes 32 through which extends a rod 33 that also passes through a hole 34 in one of the cross members 12. The rod 33 is detachable from the support since it is screw-threaded at 35 into the other cross member 12. The end of the rod 33 that projects is preferably provided with a head 36 to facilitate turning and removal of said rod.

The rod 33 projects through holes 37 in ears 38 that constitute downwardly projecting portions of index guides 39. The ears 38 project into the slot 58 and the rod 33 lies within the slot 58. The guides 39 may be provided with index tabs 40 containing index characters 41.

Hingedly connected to the clamping members 16 are end members 43 which are provided to properly support the upper portions of the loose leaves, either in the closed position illustrated in the drawings, or in open positions. The hinge is indicated at 44.

Each of the end members 43 is provided with a pair of spaced ears 45 and between each pair of ears is interposed a notched member 46 which is pivoted to the ears at 47. The notches 48 in each member 46 may be selectively brought into engagement with an abutment 49. The abutments 49 are each supported at their ends in spaced ears 50. The pairs of ears 50 project from the respective clamping members 16. The members 46 are provided with handles 51 for operating them.

Figure 3:
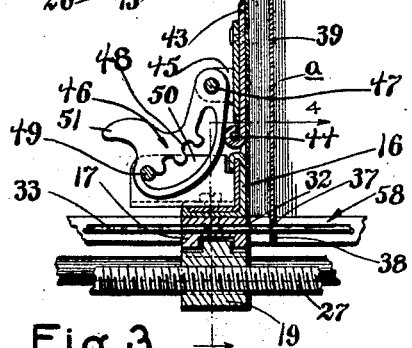
Fig. 3 is an enlarged sectional detail on the line indicated by 3—3, Fig. 2.

Referring to Fig. 3, to open the binder, the member 46 will be swung upwardly to release it from the pin 49 and then the end member 43 will be swung downwardly and the appropriate notch 48 will be engaged with the pin 49, thus supporting the end member 43 in open position. In this particular instance each member 46 is provided with three notches, the pin 49 engaging the lowermost notch when the end member 43 is vertical or in closed position, the next higher notch being engaged by the pin when the end member 43 is open sufficiently far for removing and replacing the loose leaves as is necessary in bookkeeping operations, and the uppermost notch being engaged by the pin when the end member 43 is swung downwardly sufficiently far to make it easy to refer to the different loose leaves without it being necessary to remove them from the binder.

Figure 2:
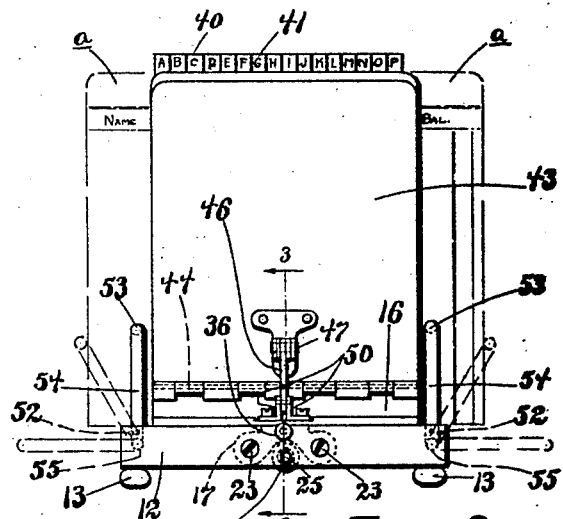
Fig. 2 is an end elevation from the left of Fig. 1, offsetting of some of the leaves being indicated in broken lines and the guides being indicated in one position in solid lines and in other positions in broken lines.
Figure 5:
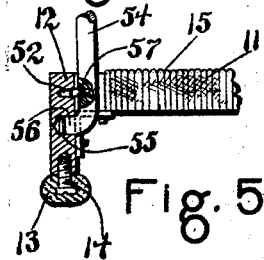
Fig. 5 is an enlarged detail, partly in section, of one of the pivotal connections between one of the guides and the support.

The opposite ends and sides of the support 11 are open, there being merely guide rods 53 at the sides having downwardly bent portions 54 suitably secured to the cross members 12. In this particular instance the cross members 12 are provided with sockets 55 in which pivot the outwardly bent ends 56 of the rods 53. Thus the rods 53 can be swung into position shown in solid lines in Fig. 2 or into other positions shown in dotted lines in said figure. To positively hold the guides 53 in the above positions of adjustment shown in Fig. 2, the rod portions 54 at one end of the rods are provided with outwardly projecting pins 57 adapted to selectively engage in recesses 52 in the inner faces of the cross members 12. The members 53 are constructed of spring material so that when it is desired to change the position of said guides the members 54 having the pins 57 will be pressed inwardly by the operator to release said pins from the recesses 52 and the guides will then be swung into the new positions and the pins 57 will be sprung into others of the recesses 52. The purpose of the guides 53 is to effect alining of the loose leaves. That is to say, all of the leaves may be positioned in register, as shown in solid lines in Fig 2, against one of the guides 53, or some of the leaves may be off-set from the others, as indicated in broken lines in Fig. 2, the other guide serving to limit movement of the off-set leaves away from the other leaves and to aline the off-set leaves.

The foregoing description will make clear the comstruction and operation of the invention, and the operation may be further briefly described as follows: Ordinarily the binder tray parts will be in the positions shown in Fig. 1 of the drawings, that is to say, the screw 25 will be turned to a position to hold the clamping members securely against the adjacent leaves and the end members will be in their vertical positions with reference to the support 11. The loose leaves, when the binder is thus closed, will be protected against dust and dirt. Assuming that the loose leaves $a$ are ledger sheets, the credit manager of the firm employing the invention, can readily refer to any one of the ledger sheets, without misplacing the same, by releasing the members 46 and swinging the end members 43 downwardly to seat the uppermost notches 48 against the pins 49.

When any of the ledger sheets are to be removed from or inserted in the binder, the screw 25 will be turned to cause the clamping members to travel away from each other, thus releasing the loose leaves. In this condition the usual accounting operations can be performed. When the binder is thus opened any of the ledger sheets can be readily removed from or replaced in the binder, but the guides will be held in place by the rod 33. If it is desired to offset any of the ledger sheets, as is the practice in machine bookkeeping, such sheets will be shifted edgewise into position to engage one of the guide rods 53, as in Fig. 2, and the binder may be closed with these sheets thus offset. This offsetting is customarily made to the right and is done, for example, in taking off the debits and credits. Before the offsetting is done, the guide 53 on the side where the offsetting is to occur, is operated into the intermediate position shown in broken lines in Fig. 2, as has been hereinbefore described. The offsetting may be effected on either side and is often done to the left to indicate to the credit manager those accounts that are past due. It will be noted that when the screw 25 is operated to move the nuts 19, the blocks 17 will adjust themselves on the rod 22 and will not be caused to bind because of the loose connections between the blocks and the nuts 19.

What is claimed is:

1. A tray binder comprising a support having a slot, clamping means on the support, rods connected with the support and positioned beneath the slot, a block slidably mounted on the rods and connected with one of the clamping members, and means loosely connected with the block to move it into different positions along the rods.

2. A tray binder comprising a support having a slot, clamping members on the support, rods connected with the support and positioned beneath the slot, a rotatably mounted screw on the support, a nut on the screw, and means loosely connecting the nut with the clamping members.

3. A tray binder comprising a support, clamping members on the support, one of said clamping members being adjustable toward and from the other clamping member, a guide rod extending along one side of the support and pivoted at its opposite ends to the support, and means selectively and positively holding the guide rod in different positions.

4. A tray binder comprising a support, a clamping member on the support, an end member hingedly connected with the clamping member, a member pivotally connected with the end member and provided with notches, an abutment connected with the clamping member to be selectively engaged by the notches, another clamping member cooperating with the first clamping member to clamp loose leaves therebetween, and an end member on the second clamping member.

5. A tray binder comprising a support, a clamping member slidably mounted on the support, means loosely connected with the clamping member to move it into different positions along the support, an end member hingedly connected with the clamping member, a second clamping member cooperating with the first mentioned clamping member to clamp loose leaves therebetween, means cooperating with the first mentioned clamping member and end member to hold the end member at different angles relative to the support while the leaves are clamped, and an end member on the second mentioned clamping member.

Signed at Los Angeles, California, this 14th day of August, 1924.

FRANK D. BARNHILL.
PACIFIC SOUTHWEST TRUST &
    SAVINGS BANK, [L. S.]
By BRUCE H. GRIGSBY,
    *Its Vice-President,*
*Executors of Charles R. Hadley, Deceased.*